US008780365B2

(12) United States Patent
Gerega

(10) Patent No.: US 8,780,365 B2
(45) Date of Patent: Jul. 15, 2014

(54) PRINTING SYSTEM WITH DYNAMIC SAMPLE PAGE PREVIEW

(75) Inventor: Matthew R. Gerega, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 1419 days.

(21) Appl. No.: 12/116,476

(22) Filed: May 7, 2008

(65) Prior Publication Data
US 2009/0279119 A1 Nov. 12, 2009

(51) Int. Cl.
G06F 3/12 (2006.01)
G06K 15/02 (2006.01)
H04N 1/60 (2006.01)
G03F 3/10 (2006.01)
G03G 15/00 (2006.01)
G03G 15/01 (2006.01)

(52) U.S. Cl.
USPC .......... 358/1.13; 358/1.15; 358/1.18; 358/1.9; 358/527; 358/501; 358/401; 399/81; 399/158

(58) Field of Classification Search
CPC ........................................... G03G 2215/00569
USPC ............... 358/1.13, 1.15, 1.18, 1.9, 527, 501, 358/401; 399/81, 158
See application file for complete search history.

(56) References Cited

U.S. PATENT DOCUMENTS

| 3,936,180 | A | * | 2/1976 | Willard et al. | 399/10 |
| 5,164,842 | A | * | 11/1992 | Gauronski et al. | 358/401 |
| 5,535,009 | A | * | 7/1996 | Hansen | 358/296 |
| 5,555,099 | A | * | 9/1996 | Telle | 358/401 |
| 7,464,866 | B2 | * | 12/2008 | Mizoi | 235/381 |
| 7,941,068 | B2 | * | 5/2011 | Kimura | 399/82 |
| 2002/0044301 | A1 | * | 4/2002 | Kitazawa | 358/1.16 |
| 2003/0128390 | A1 | * | 7/2003 | Yip et al. | 358/1.18 |
| 2004/0070631 | A1 | * | 4/2004 | Brown et al. | 345/838 |
| 2004/0114157 | A1 | * | 6/2004 | Linder et al. | 358/1.9 |
| 2004/0207862 | A1 | * | 10/2004 | Such et al. | 358/1.9 |
| 2005/0111024 | A1 | * | 5/2005 | Ferlitsch | 358/1.13 |
| 2005/0219559 | A1 | * | 10/2005 | Ito et al. | 358/1.2 |
| 2005/0219602 | A1 | * | 10/2005 | Mikami | 358/1.14 |
| 2006/0061807 | A1 | * | 3/2006 | Matsuda | 358/1.15 |
| 2006/0152748 | A1 | * | 7/2006 | McCarthy et al. | 358/1.13 |
| 2007/0002349 | A1 | * | 1/2007 | Hwang et al. | 358/1.13 |
| 2007/0242962 | A1 | * | 10/2007 | Yamamoto | 399/15 |
| 2007/0291286 | A1 | * | 12/2007 | Utsunomiya et al. | 358/1.8 |
| 2008/0231888 | A1 | * | 9/2008 | Kuwano | 358/1.15 |

FOREIGN PATENT DOCUMENTS

JP 2007-067859 * 3/2007 ............... H04N 1/00

* cited by examiner

Primary Examiner — King Poon
Assistant Examiner — Beniyam Menberu
(74) Attorney, Agent, or Firm — Fay Sharpe LLP

(57) ABSTRACT

A printing system is provided having interactive sample page preview and selection capabilities. An operator or user of a printing system, such as a xerographic copier, laser printer, or multi-function device, may visually confirm the print quality of pages printed by the system by requesting that a sample page, i.e., an extra copy of a page being printed within a print job, be printed and delivered to an alternate output tray for inspection. The present disclosure provides the ability to print the sample and show what was printed as a preview on the screen. The present disclosure additionally provides a preview of the sample page prior to its printing and delivery to an alternate tray. Based upon the previewed image, an operator may choose to print a sample page corresponding to that image, or choose another page. Additionally or alternatively, sample pages may be printed based on temporal criteria and system parameters.

21 Claims, 7 Drawing Sheets

PRINTING SYSTEM WITH DYNAMIC SAMPLE PAGE PREVIEW

BACKGROUND

The present disclosure relates to xerographic printers and photocopying machines. In particular, disclosed herein is a printing system and method for presenting dynamically generated sample pages of a print job to a printing system user.

A typical xerographic document printing system, such as a laser printer, photocopier, or multi-function device, may include a controller module, and a user interface which may have pushbuttons, lighted indicators, or an interactive display device such as a touch screen. A printing system may also include a document processing assembly (i.e., a sheet feeding assembly), an imaging assembly (for transferring an image to a sheet), and a finishing assembly (i.e., a stapler, hole puncher or binder), which function cooperatively to produce printed materials in a wide variety of formats. In a typical xerographic architecture, a printing system may include one or more output trays to which printed sheets can be delivered. In another typical xerographic architecture having a plurality of serially-coupled document finishing assemblies, separate output trays may be provided at each document finishing assembly.

Ease of use, printing speed and high quality images are desirable attributes in printing and photocopying machines. Accordingly, techniques have been developed whereby printing and photocopying machines can sense the operating conditions of the machine, convey information relating to these conditions to the user, and, additionally or alternatively, use information derived from the sensed conditions to modify the machine's operation accordingly.

For example, sensors incorporated within a printing system or photocopier can determine whether the machine's supply of xerographic toner is low, or has been exhausted. In the case where the toner supply is near depletion, for example, when less than 10% of the toner supply is remaining, a printing system may issue a message to the user via a user interface, such as a flat panel display device, alerting the user to the low toner condition. In another scenario, when the toner supply is fully depleted, a printing system may suspend printing operations until the toner is replenished, or a new toner cartridge is installed. In yet another scenario, when the system senses a malfunction, any incorrectly-printed or out of sequence sheets within each document finishing assembly may be purged to a designated output tray, which may be said to be a purge tray.

Other sensors within a printing system can include those which detect when the paper supply is exhausted, the location of a jammed or misfed sheet, or whether an original sheet that is about to be copied or scanned is of a non-standard size. In each instance, the printing system has the ability to sense a particular condition warranting attention, and take appropriate action.

However, certain conditions may arise within a printing system which cannot readily be detected by sensors. For example, normal printing system wear and tear may cause uneven rendering of images on each sheet, such as light or dark areas, which may be objectionable. In another example, a user may inadvertently or unknowingly scratch an imaging surface, such as a photoreceptor belt or drum, while clearing a jam within the printing system. Any scratch on the photoreceptor is likely to cause a corresponding mark on each output sheet. In these and similar instances, the only way to detect such undesirable image defects may be by visual inspection of an actual output page. However, this may be ineffective where large and/or multiple jobs are printed, because many pages may be wastefully printed before the operator notices a problem. Even if the operator is proactive and attempts to inspect the printed pages as they stack in the output trays, the very act of touching those pages as they exit the printer can cause jams and disruption of a print job.

One method by which printing systems have addressed this issue is by providing a "print sample page" function to the user. Typically, this sample page function is used during large print jobs whereby the user requests that a second copy of the page currently being printed be generated and delivered to a separate output tray, such as a top tray or purge tray, of the printing system. In this manner, the operator may visually evaluate the current image quality of the printer using the representative sample page just printed, without disturbing the pages being stacked in the primary output trays.

However, this method may have drawbacks because the operator does not know precisely which page is being printed, or ripped (raster image-processed), at the moment the sample page is requested, so it is nearly impossible to determine with certainty which page of the print job will be actually be sampled. Often, an operator will sample a page only to learn it was unrepresentative of the majority of the pages in the print job, i.e., the sample page may have near zero percent image area coverage (mostly white) or may have near one hundred percent image coverage (mostly black). In these cases the sample page will fail to achieve its intended purpose of providing an operator a way to monitor the ongoing print quality of a print job. As a result, the operator must repeatedly request sample prints and retrieve each page from an output bin for inspection, until a satisfactory page is obtained. This ritual wastes time, media, and other resources.

SUMMARY

The present disclosure provides an improved method for generating sample pages in document printing and xerographic copying systems. In particular, disclosed is a document printing system and method which provides to the user a preview image of a candidate sample page concurrently with, or prior to, generating the actual sample output page. The user may be given the opportunity to preview one or more sample images until an appropriately representative image has been identified by the user.

A sample page may be a page that corresponds to the page that is currently printing by the printing system. Alternatively, a sample page may correspond to a page that is currently undergoing rasterization (i.e., being converted to a bitmap image but not yet printed), page that was previously rasterized, or a page that was previously printed. In embodiments, the sample page may correspond to a page stored in, for example, a storage device operably coupled to the printing system.

In a color printing system the sample page may additionally correspond to one or more of the primary or process colors used to generate color images. For example, it may be advantageous to generate sample pages corresponding to the cyan, magenta, yellow and black colors typically used in a subtractive color printing system.

In embodiments, the printing system provides a user interface with which the user may initiate page sampling during a print or copy job. The user interface may provide the user a means to activate a sampling mode, for example, a concurrent sampling mode wherein a candidate or preview image is presented to the user substantially concurrently with the generation of the sample page. Upon activation of a concurrent sampling mode, the user may be presented with an image of a sample page that appears substantially concurrently with the printing and delivery of the sample page. In this manner the user may evaluate the sufficiency of the sample page without needing to wait for the sample page to be delivered to the output tray. Additionally, the user may cause additional sample pages to print using minimal interaction with the printing system, such as a simple button press. In this manner, the user may view the sample page preview while each sample page prints, thus permitting the user to conveniently evaluate and generate sample pages without needing to individually retrieve and review each page at the output bin.

In another envisioned embodiment, a preview mode is provided wherein a preview image of a candidate sample page corresponding to, for example, the page being currently printed, is presented to the user for evaluation prior to printing. The user may then be given a choice to accept the page, which causes the candidate page to be printed as a sample page, or to reject the candidate page, which causes a subsequent preview image of a candidate page to be displayed. In this manner the user can view and evaluate successive candidate pages until a suitable page is identified, and selectively print only those pages which meet the user's requirements. In envisioned embodiments, once the user has selected a page for printing, the user may continue to view and select subsequent candidate pages for printing. In other embodiments, once the user has chosen a page for printing, the preview mode automatically concludes. In yet other embodiments, the operation of the system is determined in accordance with pre-determined system preferences.

In yet another envisioned embodiment, an immediate sample mode is provided by the printing system wherein the user can cause to be immediately printed a sample page corresponding to the page being currently printed, without a preview.

According to the present disclosure, a xerographic printing system and method having the capability of generating preview images of sample pages, and optionally or alternatively, selectively printing and outputting sample pages, is provided. The xerographic printing system may include, in operable communication, at least one processor, a user interface module, a controller module, and a sampling module. The sampling module is capable of communicating with the user interface module, and, additionally or alternatively, with the controller module. The sampling module may further include a concurrent sampling module, a preview sampling module, and an immediate sampling module. The xerographic printing system may additionally include a storage module for storing information corresponding to a sample page.

In embodiments, a method disclosed herein of generating an image of a sample page may be performed by a processor included within the printing system. Additionally or alternatively, a disclosed method may be performed by a processor included in a general purpose computing device, such as a PC or a RIP, that may be separate from the printer. In embodiments, the disclosed methods may be performed in a distributed mode, i.e., performed on at least one processor within the printing system, and/or multiple separate computing devices or processors.

The present disclosure also provides a computer-readable medium storing a set of programmable instructions configured for being executed by at least one processor for performing an improved method for generating sample pages in printing and xerographic copying systems in accordance with the present disclosure.

BRIEF DESCRIPTION OF THE DRAWINGS

Various embodiments of the present disclosure will be described herein below with reference to the figures wherein.

DETAILED DESCRIPTION

As further described below with reference to the Figures, a printing system is disclosed having the capability of generating preview or "thumbnail" images of a sample page, and selectively generating a printed sample page in accordance with a user input.

Figure 1:
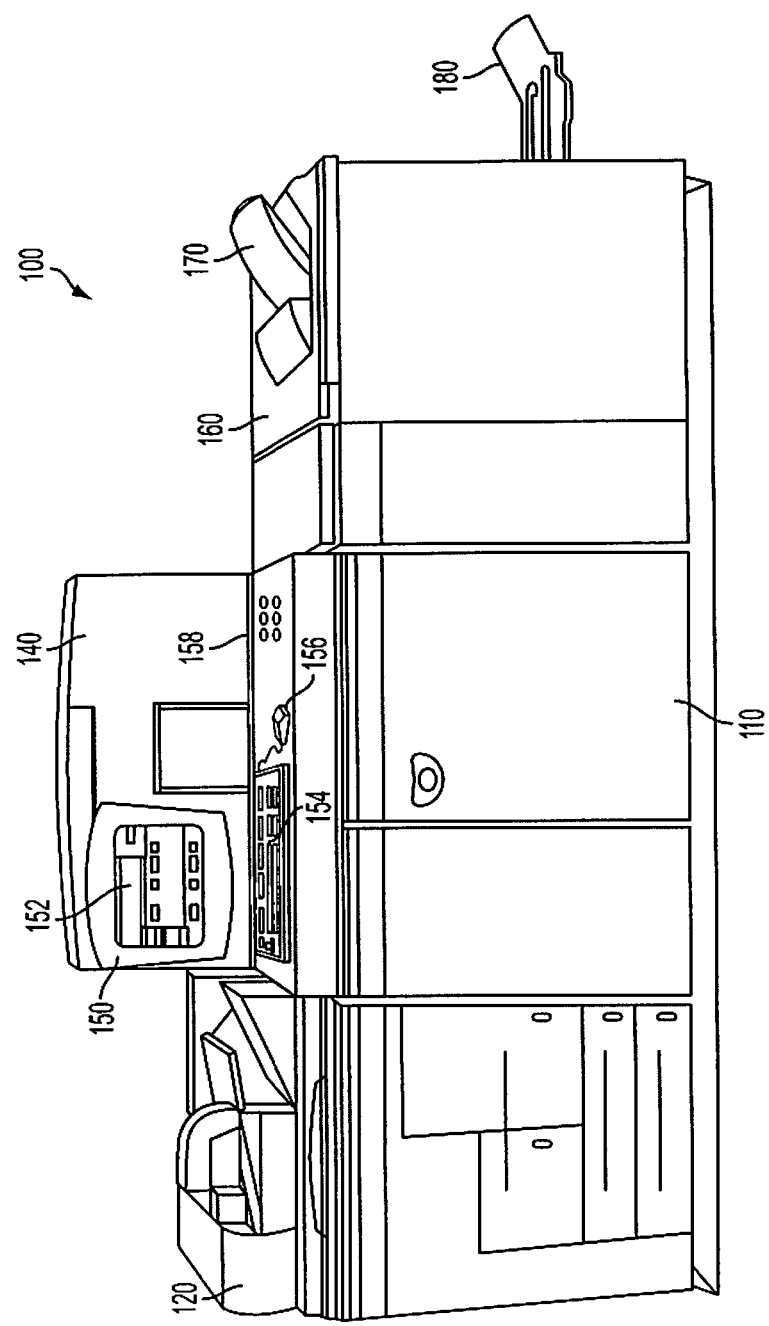
FIG. 1 is a view depicting a xerographic printing system incorporating a sampling algorithm in accordance with the present disclosure.

With reference to FIG. 1, there is shown an exemplary xerographic printing system 100 for printing, copying documents and/or finishing documents in accordance with the present disclosure. The printing system 100 includes an imaging assembly 110 for printing documents. The imaging assembly 110 is operatively coupled to a page scanner assembly 120 for scanning and copying documents. The imaging assembly 110 is further operatively coupled to at least one document finishing assembly 160 having at least one top tray 170, which may be a purge tray, and at least one output tray 180. Printing system 100 may further include a controller 140 which can be integral to imaging assembly 110, and user interface elements which can include a video display 150, which may further include a touchscreen 152. The user interface elements may additionally or alternatively include at least one pushbutton 158, a keyboard 154, a pointing device such as a mouse 156 and/or an alternative pointing device such as touchpad, a trackball or a graphics tablet (not explicitly shown) as will be familiar to the skilled artisan.

To commence a print job, an operator chooses job options, such as the image source and finishing options, to initiate printing using user interface elements keyboard 154, touchscreen 152, pointing device 156 and/or pushbuttons 158. Additionally or alternatively, an operator can use a networked device to input job options and initiate printing using, for example, application software or a printer driver as is well-known in the art. For example, an image source can be pages scanned by scanner assembly 120 (i.e., "copy") or previously-scanned pages saved within the printing system 100 (i.e., print-on-demand or "scan once print many"). Additionally or alternatively, a networked device such as a computer can initiate printing by transmitting a document to the printing system 100 as will be familiar to one of ordinary skill in the art.

Figure 2:
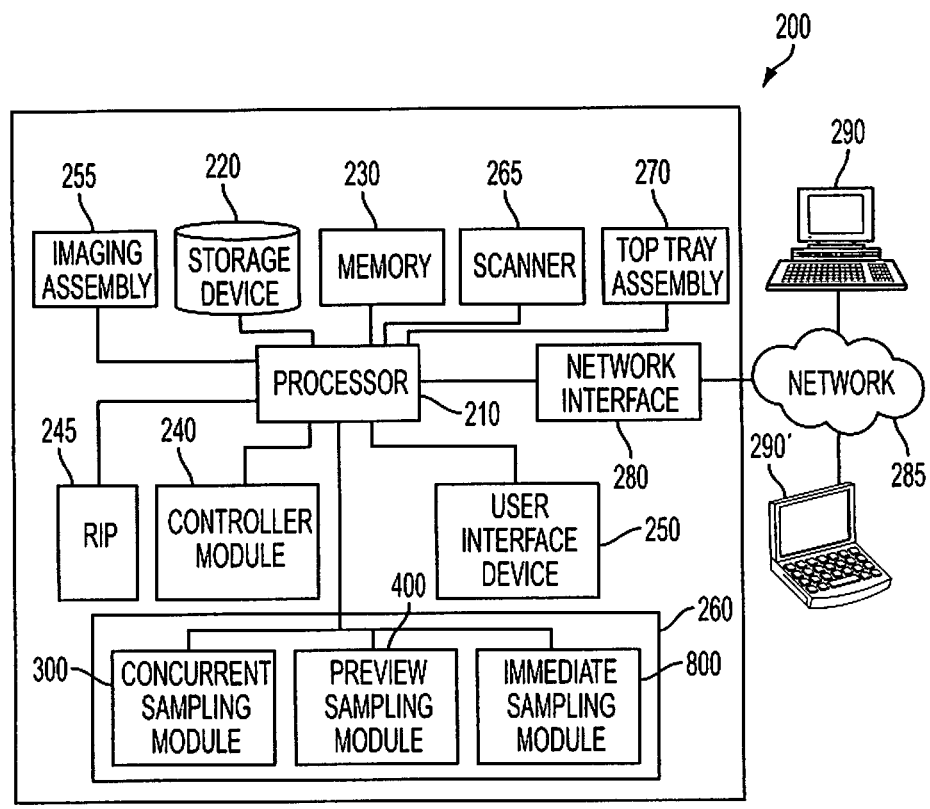
FIG. 2 is a block diagram of a xerographic printing system in accordance with the present disclosure.

As shown in FIG. 2, an embodiment of a xerographic printing system in accordance with the present disclosure may include a processor 210 that is operatively coupled to a storage device 220, memory 230, a user interface device 250, an imaging assembly 255, a page scanner 265, and a top tray assembly 270. Processor 210 may also be operatively coupled to a controller module 240 and a sampling module 260. Sampling module 260 may further include at least one of a concurrent sampling module 300 and/or a preview sampling module 400. Sampling module 260 may additionally include an immediate sample module 800. Printing system 200 may additionally include a data communication interface 280 which may be used to operatively couple printing system 200 to network devices, such as, without limitation, a personal computer 290 via a communications network 285. In an embodiment, communication interface 280 may be a wired network interface such as a 100Base-T Fast Ethernet interface, or a wireless network interface such as a wireless network interface compliant with the IEEE 802.11g ("WiFi") standard.

The printing system 200 may include a raster image processor 245 (RIP) that is operatively coupled to processor 210 for processing data related to an image. For example, RIP 245 may be a software-implemented module that performs graphics operations familiar to the skilled artisan, such as without limitation image scaling, downsampling, color transformation (e.g., changing of color bit depth), rotation, mirroring, deskewing, denoising, and rendering an image described by a page description language, such as PCL5™ or PostScript™.

Upon commencement of the print job, pages are printed within imaging assembly 110, passed sequentially to a document finishing assembly 160 for finishing, whereafter the completed documents are delivered to output tray 180. During execution of the print job, a user may activate a sampling mode by, for example, providing a user input via user interface device 250. In response, a sampling module corresponding to the selected sampling mode, as indicated by the user input, is activated as will now be described with reference to the Figures. For example, if the user selects the concurrent sampling mode, the concurrent sampling module 300 may be activated. Similarly, if the user selects the preview sampling mode, a preview sampling mode 400 or alternative preview sampling mode 500 may be activated.

Figure 3:
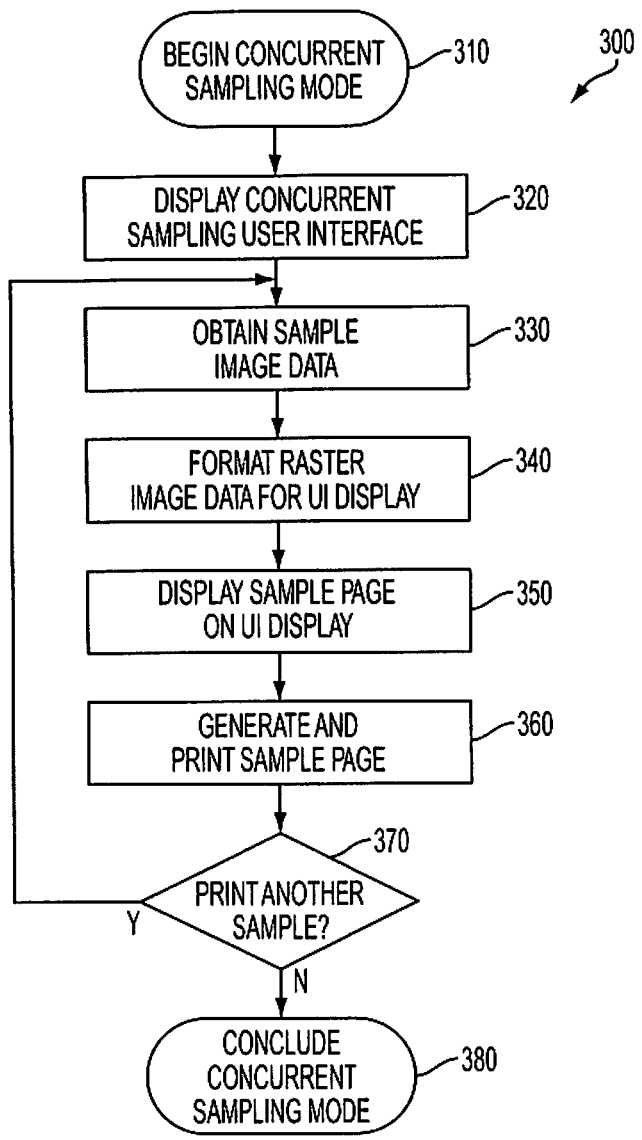
FIG. 3 is a flow diagram of a concurrent sampling module in accordance with the present disclosure.
Figure 6:
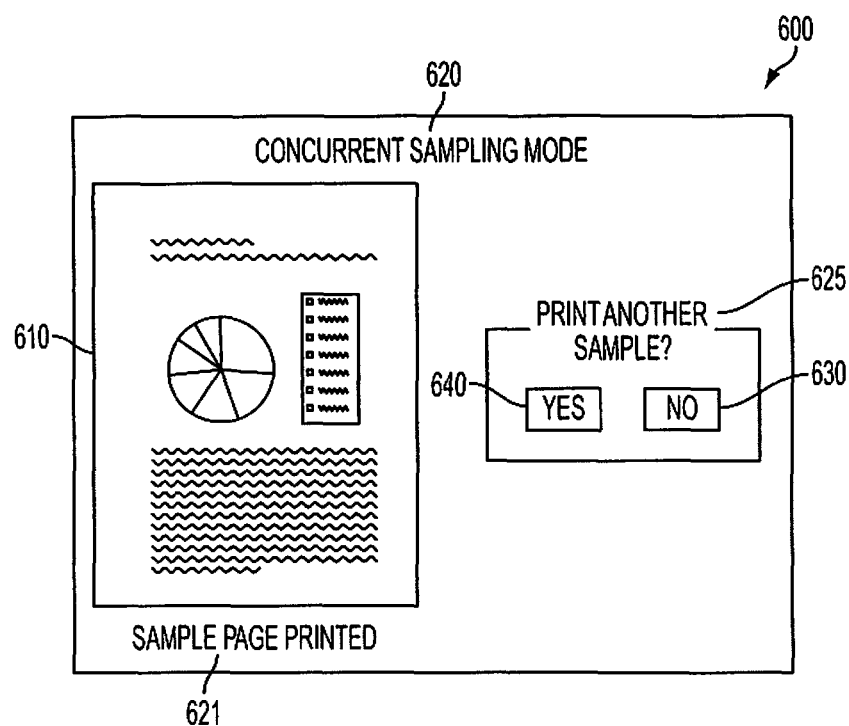
FIG. 6 illustrates an exemplary user interface of a concurrent sampling mode in accordance with the present disclosure.

Referring now to FIGS. 3 and 6, a concurrent sampling mode 300 in accordance with the present disclosure begins in the step 310, which may be an initialization step wherein necessary system resources are allocated and prepared for use. In the step 320 a concurrent sampling mode, as indicated by element 620 on user interface 600, is presented to the user via user interface device 250. It is to be understood that concurrent sampling mode user interface 600 as shown in FIG. 6, and preview sampling mode user interface 700 as shown in FIG. 7, are for purposes of illustration only and not to be construed as limiting the present disclosure to a particular embodiment. In the step 330, the concurrent sampling module 300 obtains sample image data relating to a sample page (i.e., image data corresponding to a page then being processed, i.e., a page being rasterized, scanned, printed, or previously stored as described herein). In embodiments, the image data may be obtained from any suitable source, such as, without limitation, from RIP module 245, from memory 230, from storage device 220, or from controller module 240.

In the step 340, the sample image data may be processed to facilitate the display thereof on user interface device 250, which may require image data to be formatted differently than, for example, imaging assembly 255. As examples only, the sample image data may require at least one of scaling, downsampling, rotation, aspect ratio correction, or color bit depth reduction in order to be displayable on user interface 250, as will be familiar to the skilled artisan. In the step 350, the sample page image may be displayed to the user as a thumbnail image 610 as indicated by element 621 on the user interface 250. In embodiments, the sample page image may be presented to the user as a full-size or greater than full-size image. It is also envisioned the page image may be variable in size, wherein the user may zoom in or out to view more or less detail, as desired. The sample page is printed and delivered to a top tray assembly 270 in the step 360. The user may be queried using interface element 625 in the step 370 whether another sample page is to be printed. In an embodiment, the user may be presented with user interface elements 640, 630 corresponding to a "Yes" or "No" response, respectively. In response to a "Yes" user input, processing iterates with the step 330 in which sample image data corresponding to a subsequent page is obtained. In response to a "No" user input, the concurrent sampling mode concludes in the step 380.

Embodiments are envisioned wherein the user may specify a destination tray to which the sample page is to be delivered. For example, a default configuration may be provided wherein the sample delivery tray is the purge tray (i.e., top tray 170) associated with a document finishing assembly positioned nearest to imaging assembly 110. In a printing system having a plurality of document finishing assemblies, the user may be given an option to designate a top tray associated with an arbitrary document finishing assembly as the delivery tray for sample pages. Also envisioned is a "rolling" delivery assignment wherein sample page may be delivered to a plurality of trays in a manner based upon, for example, predetermined conditions or system characteristics.

Figure 4:
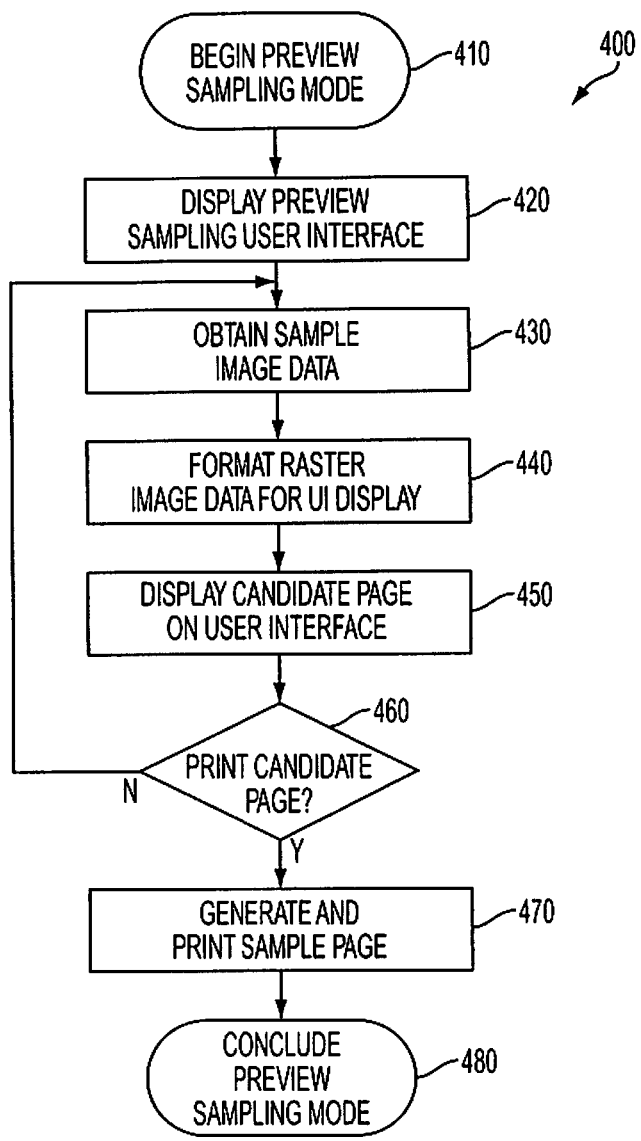
FIG. 4 is a flow diagram of a preview sampling module in accordance with the present disclosure.
Figure 7A:
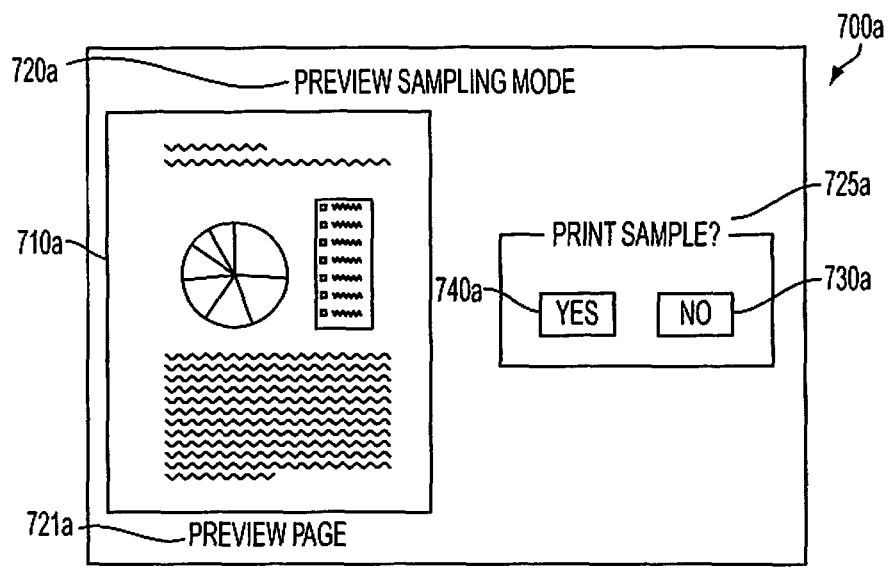
FIG. 7a illustrates an exemplary user interface of a preview sampling mode in accordance with the present disclosure.
Figure 7B:
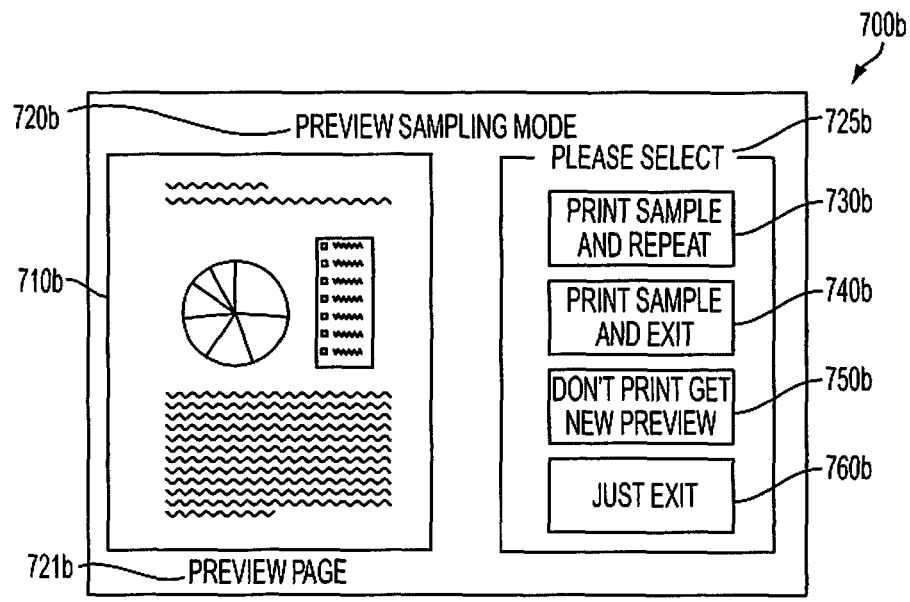
FIG. 7b illustrates another exemplary user interface of a preview sampling mode in accordance with the present disclosure.

Turning now to FIGS. 4 and 7a, a preview sampling mode 400 in accordance with the present disclosure begins in the step 410, which may be an initialization step wherein necessary system resources are allocated and prepared for use. In the step 420 a preview sampling mode, indicated as element 720a on the user interface 700a, is presented to the user via user interface device 250. In the step 430, the preview sampling module 400 obtains sample image data relating to a sample page as previously described herein. In the step 440, the sample image data may be processed to facilitate the display thereof on user interface device 250, which may require image data to be formatted differently than, for example, imaging assembly 255, as previously described. In the step 450, the sample page image may be displayed to the user as a thumbnail image 710a and indicated by element 721a on user interface 250. In the step 460 user input is solicited using interface element 725a to indicate whether the preview (i.e., candidate) page that is depicted as a thumbnail image 710a be printed as a sample page. The user may input an affirmative response by activating the "Yes" user interface element 740a, whereupon in the step 470 the sample page corresponding to the candidate page is printed and delivered to a top tray assembly 270, and in the step 480, the preview sampling mode concludes. If, however, the user responds in the negative by, for example, activating the "No" user interface element 730a, execution iterates with the step 430 wherein sample image data corresponding to a subsequent page is obtained.

Figure 5:
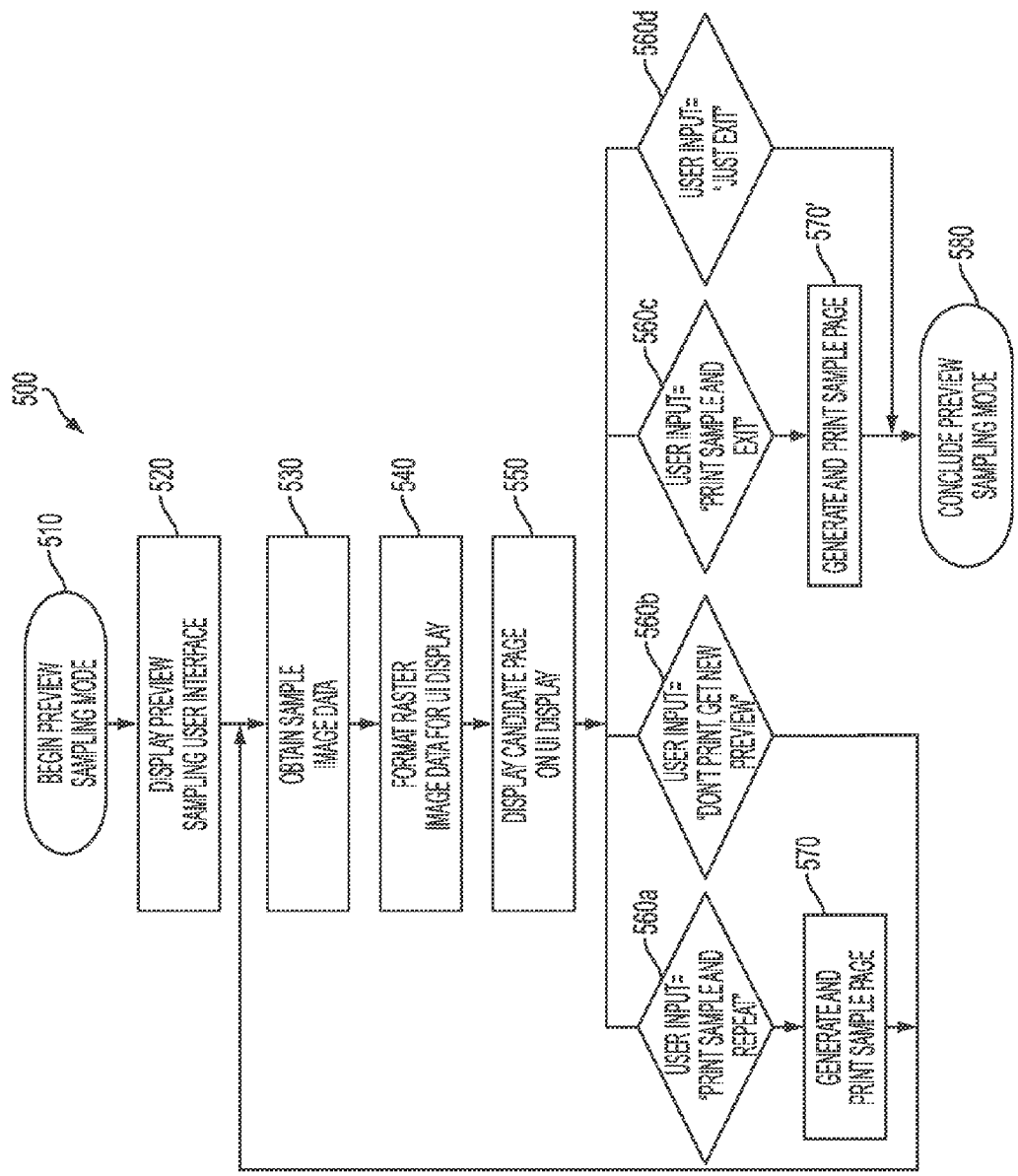
FIG. 5 is a flow diagram of an alternative preview sampling module in accordance with the present disclosure.

Other embodiments are envisioned with the scope of the present disclosure which may offer the user additional options for selecting and printing sample pages. For example, it may be desirable to accommodate a user who requires the ability to monitor print quality on a regular or periodic basis. In this instance, it may be advantageous to provide to the user the option to cause to be printed a sample page, then automatically display a subsequent sample page, which then may be selected for printing or rejected in favor of yet another page. Similarly, it may be advantageous to permit the user, using a single input, to cause to be printed one sample page, then immediately exit the preview sampling mode. It may also be advantageous to permit the user to end the preview mode without printing any page. Directing the reader's attention now to FIGS. 5 and 7b, an alternative preview sampling mode 500 in accordance with the present disclosure begins in the step 510, which may be an initialization step wherein necessary system resources are allocated and prepared for use. In the step 520 an alternative preview sampling mode user interface 700b is indicated as element 720b and presented to the user via user interface device 250. In the step 530, alternative preview sampling module 500 obtains sample image data relating to a sample page as previously described herein. In the step 540, the sample image data may be processed to facilitate the display thereof on user interface device 250, which may require image data to be formatted differently than, for example, imaging assembly 255, as previously described. In the step 550, the sample page image may be displayed to the user as a thumbnail image 710b and indicated by element 721b on user interface 250. In the steps 560a-d user input is solicited using interface element 725b and evaluated. In the present illustrative embodiment, alternative preview sampling mode user interface 700b provides four user interface elements 730b, 740b, 750b, 760b corresponding to the user interface solicitation and evaluation steps 560a, 560c, 560b, and 560d, respectively.

Activation of user interface element 730b (i.e., "Print Sample and Repeat") is recognized in the step 560a, whereupon in the step 570 the sample page corresponding to the displayed preview page 710b is printed and delivered to the sample output tray, i.e., top tray assembly 270. Consequently, execution iterates with step 530 whereupon sample image data corresponding to a subsequent page is obtained.

Activation of user interface element 740b (i.e., "Print Sample and Exit") is recognized in the step 560c, whereupon in the step 570' the sample page corresponding to the displayed preview page 710b is printed and delivered to the sample output tray as previously described, whereupon in the step 580 the preview sampling mode concludes.

Activation of user interface element 750b (i.e., "Don't Print, Get New Preview") is recognized in the step 560b, causing execution to iterate with step 530 (without printing a sample page) whereupon sample image data corresponding to a subsequent page is obtained.

Activation of user interface element 760b (i.e., "Just Exit") is recognized in the step 560b, causing the preview sampling mode to conclude with the step 580.

Also contemplated are sampling modes wherein a sample page is generated automatically on a temporal basis, on a page count basis, or when a page meets predetermined parameters, or any such factors in combination. As examples only, without limitation, a sample page prints after every nth unit of time, a sample page prints after every nth page of a print job is printed, and a sample page prints if a page having over 90% image area coverage is printed, the toner supply is less than 10% remaining, and the last sample page was printed not less than 30 seconds (or 100 pages) earlier.

It is contemplated that the steps of a method in accordance with the present disclosure can be performed in a different ordering than the ordering provided herein.

Also provided in accordance with the present disclosure is a computer-readable medium storing a set of programmable instructions configured for being executed by at least one processor of a document printing system for performing a method of displaying and printing sample pages as described herein.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. The claims can encompass embodiments in hardware, software, or a combination thereof.

What is claimed is:

1. In a printing system having a plurality of output trays, a method for generating sample pages comprising:
   a) after commencement of a print job, causing to be displayed on a user interface device a sample page user interface during an execution of the print job, the execution including delivering the print job to a first output tray;
   b) in response to a sampling mode indicated by user-input made during the execution, activating a preview for a sample page representative of an actual page of the print job being printed;
   c) obtaining image data corresponding to a candidate sample page corresponding to a page being processed for the execution;
   d) formatting the image data;
   e) displaying the formatted image data;
   f) soliciting user input for printing the candidate sample page;
   g) in response to receiving input for not printing the candidate sample page, replacing the candidate sample page with a subsequent page as the next candidate sample page, and returning to step c);
   h) in response to receiving the user input for printing and while continuing the execution, printing and delivering to a predetermined output tray, different from the first output tray, at least one sample page corresponding to the candidate sample page, the printing and delivering occurring during the execution of the print job for providing the user with a current image quality of the system; and,
   i) repeating c) to i).

2. The method in accordance with claim 1, further comprising:
   j) determining whether a predetermined condition exists; and
   k) responding to a determination that a predetermined condition exists by iteratively repeating the steps c) through k).

3. The method in accordance with claim 2, wherein the determination whether a predetermined condition has been reached is in accordance with a user input.

4. The method in accordance with claim 2, wherein the determination whether a predetermined condition has been reached is in accordance with criteria selected from the group consisting of temporal criteria and a printing system parameter.

5. The method in accordance with claim 4, wherein the temporal criteria is derived from the time corresponding to the printing of a sample page.

6. The method in accordance with claim 4, wherein the printing system parameter corresponds to at least one of the group consisting of the quantity of toner supply remaining in the printing system and the image area coverage of the candidate sample page.

7. The method in accordance with claim 1, wherein the user interface device includes a device selected from the group consisting of a graphics display, a touchscreen, a pushbutton, a keyboard, and a pointing device.

8. The method in accordance with claim 1, wherein the printing system is a xerographic printing system.

9. The method in accordance with claim 1, wherein:
the printing system is a color printing system utilizing at least one component color; and
the at least one sample page corresponds to a component color of the color printing system.

10. In a printing system having a plurality of output trays, a method for generating sample pages comprising:
a) after commencement of a print job, causing to be displayed on a user interface device a sample page user interface during processing of the print job, the processing including delivering the print job to a first output tray;
b) obtaining image data corresponding to a first candidate sample page relating to image data being printed;
c) formatting the image data;
d) displaying the formatted image data as an image representative of the print job for monitoring current print quality with options to print the formatted image data or conclude a sampling mode;
e) in response to receiving input for not printing the candidate sample page, replacing the first candidate sample page with a subsequent page as the next candidate sample page, obtaining image data corresponding to the next candidate sample page relating to image data being printed, and returning to step c);
f) in response to accepting a user input for one of printing the first or next candidate sample page or concluding the processing, during the execution simultaneously delivering to a second and different output tray a sample page corresponding to one of the first and next candidate sample pages in accordance with the user input, the sample page for providing the user with a current image quality of the system, during the execution simultaneously delivering to a second and different output tray a sample page corresponding to one of the first and next candidate sample pages in accordance with the user input, the sample page for providing the user with a current image quality of the system.

11. The method in accordance with claim 10, further comprising:
repeating steps b) through f) in accordance with the user input.

12. The method in accordance with claim 10, wherein the user interface device includes a device selected from the group consisting of a graphics display, a touchscreen, a push-button, a keyboard, and a pointing device.

13. The method in accordance with claim 10, wherein the printing system is a xerographic printing system.

14. A printing system, comprising:
a plurality of output trays;
at least one processor operatively coupled to the output trays, the processor being configured to execute a print job to a first one of the plurality of output trays;
a user interface device operatively coupled to the processor; and
a sampling module having a set of programmable instructions configured for being executed by the processor, the sampling module configured to:
a) after commencement of a print job, cause to be displayed on the user interface device a sample page user interface during the execution of the print job;
b) in response to a sampling mode received as selected input, activate a preview for a sample page representative of an actual page being printed;
c) obtain image data corresponding to a candidate sample page;
d) format the image data;
e) display the formatted image data;
f) provide an option on the user interface for printing the candidate sample page;
g) in response to receiving input for not printing the candidate sample page, replace the candidate sample page with a subsequent page as the next candidate sample page, and returning to step c);
h) in response to a received selection for printing, cause to be printed and delivered to a second and different one of the plurality of output trays at least one of the candidate sample page and different page for the evaluating of the current image quality of the system.

15. The printing system according to claim 14, wherein the sampling module is further configured to accept a user input.

16. The printing system according to claim 15, wherein the at least one sample page is delivered to at least one of the output trays in accordance with the user input.

17. The printing system according to claim 14, further comprising a data communication interface operatively coupled to the processor.

18. The printing system according to claim 14, further comprising a page scanner operatively coupled to the processor.

19. The printing system according to claim 14, wherein the printing system is a xerographic printing system.

20. The printing system according to claim 14, wherein the printing system is a multi-function device.

21. The printing system according to claim 14, wherein the printing system is a color printing system.

* * * * *